United States Patent
Pan et al.

(10) Patent No.: US 9,564,127 B2
(45) Date of Patent: Feb. 7, 2017

(54) SPEECH RECOGNITION METHOD AND SYSTEM BASED ON USER PERSONALIZED INFORMATION

(71) Applicant: IFLYTEK CO., LTD., Hefei (CN)

(72) Inventors: Qinghua Pan, Hefei (CN); Tingting He, Hefei (CN); Guoping Hu, Hefei (CN); Yu Hu, Hefei (CN); Qingfeng Liu, Hefei (CN)

(73) Assignee: iFLYTEK Co., Ltd., Hefei (CN)

( * ) Notice: Subject to any disclaimer, the term of this patent is extended or adjusted under 35 U.S.C. 154(b) by 0 days.

(21) Appl. No.: 14/655,946

(22) PCT Filed: Dec. 20, 2013

(86) PCT No.: PCT/CN2013/090037
§ 371 (c)(1),
(2) Date: Jun. 26, 2015

(87) PCT Pub. No.: WO2014/101717
PCT Pub. Date: Jul. 3, 2014

(65) Prior Publication Data
US 2015/0348542 A1    Dec. 3, 2015

(30) Foreign Application Priority Data
Dec. 28, 2012    (CN) .......................... 2012 1 0585934

(51) Int. Cl.
*G10L 15/187*    (2013.01)
*G10L 15/18*    (2013.01)
(Continued)

(52) U.S. Cl.
CPC .............. *G10L 15/18* (2013.01); *G06F 3/167* (2013.01); *G10L 15/083* (2013.01); *G10L 15/14* (2013.01);
(Continued)

(58) Field of Classification Search
None
See application file for complete search history.

(56) References Cited

U.S. PATENT DOCUMENTS

| 5,040,218 | A | | 8/1991 | Vitale et al. |
| 6,088,669 | A | * | 7/2000 | Maes ...................... G10L 17/00 704/231 |

(Continued)

FOREIGN PATENT DOCUMENTS

| CN | 1753083 A | 3/2006 |
| CN | 101194305 A | 6/2008 |

(Continued)

OTHER PUBLICATIONS

PCT International Search Report dated Mar. 27, 2014, issued in corresponding International Application No. PCT/CN2013/900037 (10 pages).

(Continued)

*Primary Examiner* — Pierre-Louis Desir
*Assistant Examiner* — Jonathan Kim
(74) *Attorney, Agent, or Firm* — Lowenstein Sandler LLP; Jialin Zhong, Esq.

(57) ABSTRACT

The present invention relates to a speech recognition method and system based on user personalized information. The method comprises the following steps: receiving a speech signal; decoding the speech signal according to a basic static decoding network to obtain a decoding path on each active node in the basic static decoding network, wherein the basic static decoding network is a decoding network associated with a basic name language model; if a decoding path enters a name node in the basic static decoding network, network extending is carried out on the name node according to an affiliated static decoding network of a user, wherein the affiliated static decoding network is a decoding network associated with a name language model of a particular user;

(Continued)

and returning a recognition result after the decoding is completed. The recognition accuracy rate of user personalized information in continuous speech recognition may be raised by using the present invention.

16 Claims, 9 Drawing Sheets

(51) Int. Cl.
G06F 3/16 (2006.01)
G10L 19/00 (2013.01)
G10L 15/14 (2006.01)
G10L 15/08 (2006.01)
G10L 15/22 (2006.01)
G10L 15/197 (2013.01)

(52) U.S. Cl.
CPC .............. G10L 19/00 (2013.01); *G10L 15/187* (2013.01); *G10L 15/197* (2013.01); *G10L 2015/227* (2013.01)

(56) References Cited

U.S. PATENT DOCUMENTS

| | | | | |
|---|---|---|---|---|
| 7,275,033 | B1* | 9/2007 | Zhao | G10L 15/197 704/255 |
| 8,478,787 | B2* | 7/2013 | Wu | G06F 17/278 707/791 |
| 8,762,156 | B2* | 6/2014 | Chen | G10L 15/26 704/10 |
| 2002/0013707 | A1* | 1/2002 | Shaw | G10L 15/063 704/257 |
| 2003/0191625 | A1* | 10/2003 | Gorin | G06F 17/278 704/1 |
| 2004/0153306 | A1* | 8/2004 | Tanner | G06F 17/273 704/4 |
| 2005/0043948 | A1* | 2/2005 | Kashihara | G10L 15/142 704/242 |
| 2005/0192793 | A1* | 9/2005 | Cote | G10L 15/187 704/4 |
| 2005/0209844 | A1* | 9/2005 | Wu | G06F 17/2223 704/2 |
| 2006/0020461 | A1* | 1/2006 | Ogawa | G10L 15/04 704/251 |
| 2007/0061023 | A1 | 3/2007 | Hoffberg et al. | |
| 2007/0162281 | A1* | 7/2007 | Saitoh | G10L 15/197 704/251 |
| 2008/0154601 | A1* | 6/2008 | Stifelman | G10L 15/22 704/251 |
| 2009/0326945 | A1* | 12/2009 | Tian | G10L 15/005 704/254 |
| 2010/0145694 | A1* | 6/2010 | Ju | G10L 15/1815 704/235 |
| 2010/0250241 | A1* | 9/2010 | Iwahashi | G10L 15/1822 704/10 |
| 2010/0306139 | A1* | 12/2010 | Wu | G06F 17/278 706/12 |
| 2011/0055256 | A1* | 3/2011 | Phillips | G10L 15/30 707/769 |
| 2011/0093265 | A1* | 4/2011 | Stent | G10L 15/06 704/243 |
| 2013/0006629 | A1* | 1/2013 | Honda | G06F 17/30681 704/236 |
| 2013/0090921 | A1* | 4/2013 | Liu | G10L 15/22 704/10 |
| 2013/0346078 | A1* | 12/2013 | Gruenstein | G10L 15/26 704/235 |
| 2015/0058018 | A1* | 2/2015 | Georges | G10L 15/08 704/257 |

FOREIGN PATENT DOCUMENTS

| | | |
|---|---|---|
| CN | 101454827 A | 6/2009 |
| CN | 101923854 A | 12/2010 |
| CN | 102265612 A | 11/2011 |
| CN | 102592595 A | 7/2012 |
| CN | 103065630 A | 4/2013 |
| EP | 1528539 A1 | 5/2005 |
| JP | 2002-108389 A | 4/2002 |
| JP | 2003-228394 A | 8/2003 |
| WO | WO 2009/156815 A1 | 12/2009 |

OTHER PUBLICATIONS

Chinese First Office Action dated Jun. 24, 2014, issued in corresponding Chinese Application No. 201210585934.7 (9 pages).

* cited by examiner

SPEECH RECOGNITION METHOD AND SYSTEM BASED ON USER PERSONALIZED INFORMATION

FIELD OF THE INVENTION

The present invention relates to the technical field of speech recognition, and specifically to a speech recognition method and system based on user personalized information.

BACKGROUND OF THE INVENTION

With the popularity of speech input function and application on intelligent terminals such as mobile phones and the like, there are more and more demands of users for the use of speech input on intelligent terminals such as mobile phones and the like, and higher requirements have also been put forward for user personalized information, especially for the accuracy rate of recognition of contacts in an address book. Unfortunately, due to the limitation in language model training mode and recognition method, the traditional continuous speech recognition system may be unable to provide a correct word for the Chinese speech signal in which there are polyphone characters, and especially in name information recognition, the recognition accuracy rate is subject to further restrictions, and the main problems are as follows:

1. there are a large number of common names in Chinese, for which name words are usually treated as unlisted words in the dictionary of continuous speech recognition, and that results in an extremely limited number of names covered in a training corpus;

2. secondly, there are a lot of homophones in Chinese names: common names have dozens of or even more combinations of Chinese characters; and 3. for each user, there may still be some names which are not so commonly used in the names of contacts in a user-specific personalized address book, namely each personalized name list cannot be uniformly covered in the training corpus.

Based on the above reasons, the language model for continuous speech recognition in the prior art cannot well simulate name words, especially personalized words of names of user contacts, and the name recognition effects are also often significantly worse than the recognition effect of other contents. Obviously, how to improve the user personalized information in continuous speech recognition, especially the recognition accuracy rate of name information has become an urgent problem to be solved for a continuous speech recognition system.

SUMMARY OF THE INVENTION

The present invention provides a speech recognition method and system based on user personalized information to raise the recognition accuracy rate of user personalized information in continuous speech recognition.

Some embodiments of the present invention provide a speech recognition method based on user personalized information, comprising:

receiving a speech signal;

decoding the speech signal according to a basic static decoding network to obtain a decoding path on each active node in the basic static decoding network, wherein the basic static decoding network is a decoding network associated with a basic name language model;

if a decoding path enters a name node in the basic static decoding network, extending an extra network on the name node according to an affiliated static decoding network of a user, wherein the affiliated static decoding network is a decoding network associated with a name language model of a particular user; and returning a recognition result after the decoding is completed.

Preferably, the method further comprises the following steps:

determining the affiliated static decoding network of the user before the speech signal is decoded according to the basic static decoding network; or determining the affiliated static decoding network of the user after a decoding path enters a name node in the basic static decoding network.

Preferably, the step of determining the affiliated static decoding network of the user comprises:

determining the user identity according to a feature of the speech signal, and then determining the affiliated static decoding network of the user according to the user identity; or determining the user identity according to an equipment code or account number of the user, and then determining the affiliated static decoding network of the user according to the user identity.

Preferably, the method further comprises the following steps:

generating a basic name language model and a name language model of a particular user; and respectively building a basic static decoding network associated with the basic name language model and an affiliated static decoding network associated with the name language model of the particular user.

Preferably, the step of generating a basic name language model comprises:

respectively collecting a name database and a training corpus for language model;

statistically analyzing conventional words and the associated relationships between the conventional words and name words according to the name database and the training corpus for language model; and generating a basic name language model according to the statistical result.

Preferably, the step of statistically analyzing conventional words and the associated relationships between the conventional words and name words according to the name database and the training corpus for language model comprises:

carrying out name detection in the training corpus according to names in the name database;

replacing all of the specific names in the training corpus with a unified virtual name; and statistically analyzing conventional words and the associated relationships between the conventional words and name words according to the replaced training corpus.

Preferably, the step of building a basic static decoding network associated with the basic name language model comprises:

providing a virtual pronunciation for the virtual name, so that the virtual name can participates in the static network extension of an acoustic model as a common word;

determining special nodes in the extended static network according to the virtual pronunciation, wherein the special nodes comprise: a node which enters a name unit and an ending node of a name unit; and extending a virtual pronunciation unit on an incoming arc or outgoing arc of the special node to obtain a basic static decoding network associated with the basic name language model.

Preferably, the step of generating a name language model of a particular user comprises:

extracting a name from name-associated information associated with the user, and recording the name as a name entry;

setting a word frequency probability for each name entry, and generating a name language model of a particular user according to the word frequency probability of the name entry;

the step of building an affiliated static decoding network associated with the name language model of the particular user comprises:

respectively setting the pronunciation of the word at the beginning and the end of a sentence in the name language model of the particular user to a virtual special pronunciation; and extending a special pronunciation unit on the outgoing arc of the node at the beginning of a sentence and the incoming arc of the node at the end of a sentence to obtain an affiliated static decoding network associated with the name language model of the particular user.

Some embodiments of the present invention further provide a speech recognition system based on user personalized information, comprising:

a receiving unit for receiving a speech signal;

a decoding unit for decoding the speech signal according to a basic static decoding network to obtain a decoding path on each active node in the basic static decoding network, wherein the basic static decoding network is a decoding network associated with a basic name language model;

a check unit of decoding path for determining whether a decoding path enters a name node in the basic static decoding network;

a network extending unit for, after the check unit of decoding path determines that a decoding path enters a name node in the basic static decoding network, extending an extra network on the name node according to an affiliated static decoding network of a user, wherein the affiliated static decoding network is a decoding network associated with a name language model of a particular user; and a result output unit for returning a recognition result after the decoding is completed.

Preferably, the system further comprises:

a determining unit for determining the affiliated static decoding network of the user before the decoding unit decodes the speech signal frame by frame according to the basic static decoding network; or determining the affiliated static decoding network of the user after the check unit of decoding path determines that a decoding path enters a name node in the basic static decoding network.

Preferably, the determining unit is used specifically for determining the user identity according to a feature of the speech signal, and then determining the affiliated static decoding network of the user according to the user identity; or determining the user identity according to an equipment code or account number of the user, and then determining the affiliated static decoding network of the user according to the user identity.

Preferably, the system further comprises:

a basic name language model building unit for generating a basic name language model;

a personalized name language model building unit for generating a name language model of a particular user;

a basic static decoding network building unit for building a basic static decoding network associated with the basic name language model; and an affiliated static decoding network building unit for building an affiliated static decoding network associated with the name language model of the particular user.

Preferably, the basic name language model building unit comprises:

a name collecting unit for collecting a name database;

a corpus collecting unit for collecting training corpus for language model;

a statistics unit for statistically analyzing conventional words and the associated relationships between the conventional words and name words according to the name database and the training corpus for language model; and a basic name language model building unit for generating a basic name language model according to the statistical result obtained by the statistics unit.

Preferably, the statistics unit comprises:

a detecting subunit for carrying out name detection in the training corpus according to names in the name database;

a replacing subunit for replacing all of the specific names in the training corpus with a unified virtual name; and a statistics subunit for statistically analyzing conventional words and the associated relationships between the conventional words and name words according to the replaced training corpus.

Preferably, the basic static decoding network building unit comprises:

a virtual pronunciation providing unit for providing a virtual pronunciation for the virtual name, so that the virtual name can participate in the static network extension of an acoustic model as a common word;

a special node determining unit for determining special nodes in the extended static network according to the virtual pronunciation, wherein the special nodes comprise: a node which enters a name unit and an ending node of a name unit; and a first extending unit for extending a virtual pronunciation unit on an incoming arc or outgoing arc of the special node to obtain a basic static decoding network associated with the basic name language model.

Preferably, the personalized name language model building unit comprises:

a name extracting unit for extracting a name from name-associated information associated with the user, and recording the name as a name entry;

a personalized name language model building unit for setting a word frequency probability for each name entry, and generating a name language model of a particular user according to the word frequency probability of the name entry;

the affiliated static decoding network building unit comprises:

a setting unit for respectively setting the pronunciation of the word at the beginning and the end of a sentence in the name language model of the particular user to a virtual special pronunciation; and a second extending unit for extending a special pronunciation unit on the outgoing arc of the node at the beginning of a sentence and the incoming arc of the node at the end of a sentence to obtain an affiliated static decoding network associated with the name language model of the particular user.

The embodiment of the present invention provides a speech recognition method and system based on user personalized information, wherein the method includes the following steps: after a speech signal input by a user is received, decoding the speech signal according to a basic static decoding network associated with a basic name language model to obtain a decoding path on an active node in the basic static decoding network, if a decoding path enters a name node in the basic static decoding network, further extending an extra network on the name node according to a affiliated static decoding network of a user associated with a name language model of a particular user, thus not only is the recognition accuracy rate of personalized names of contacts in continuous speech recognition raised, but also the recognition accuracy rate of the contents of the context for names of contacts is raised. The information of contacts is used in many aspects of speech recognition, so that the overall recognition effect is optimized, and the recognition accuracy rate of user personalized information in continuous speech recognition is raised.

BRIEF DESCRIPTION OF THE DRAWINGS

In order to more clearly illustrate the technical solutions in the embodiment of the present application or the prior art, given below is a brief introduction on the accompanying drawings to be used for illustration of the embodiment; obviously, the accompanying drawings illustrated below are only some embodiments recorded in the present invention; for those skilled in the art, it is also possible to derive other drawings according to these drawings.

DETAILED DESCRIPTION OF THE EMBODIMENTS

Figure 1:
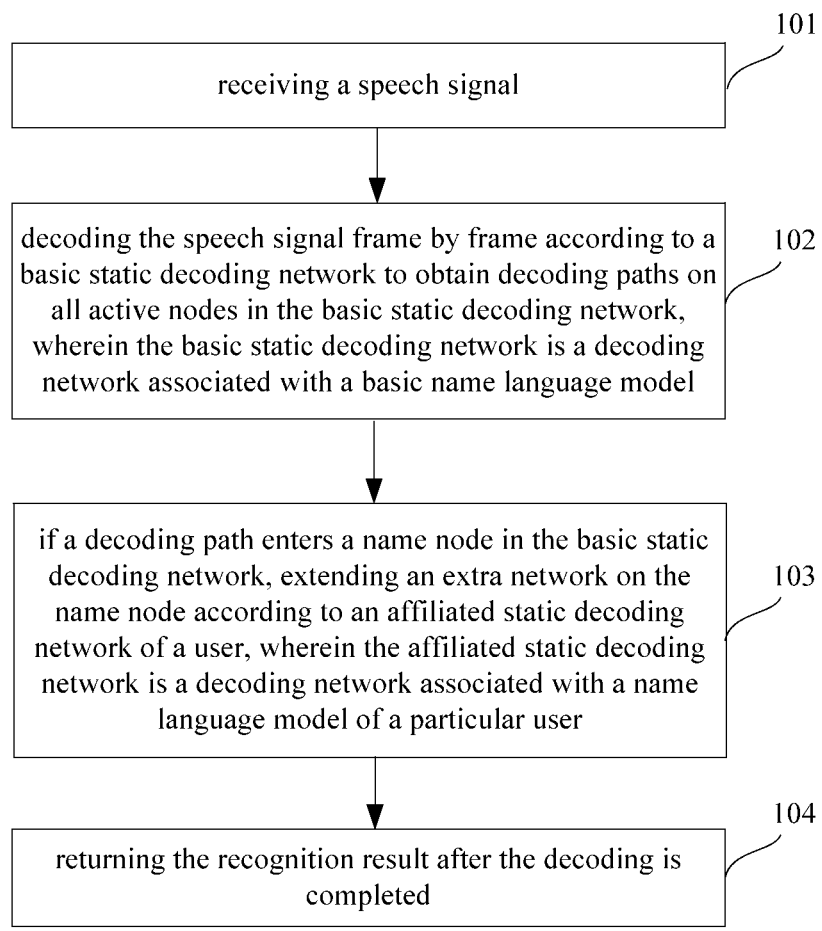
FIG. 1 is a flowchart of a speech recognition method based on user personalized information provided by the embodiment of the present invention.

Embodiments of the present invention will be described in detail below, the example of the embodiment shown in the accompanying drawings, throughout which the same or similar reference numerals designate same or similar elements or have the same or similar functions. Embodiments described below with reference to the accompanying drawings are exemplary only for explaining the present invention and are not construed as limiting the present invention.

In view of the problem that the existing language model for continuous speech recognition cannot well simulate name words, especially user personalized words of names of contacts, the embodiment of the present invention provides a speech recognition method and system based on user personalized information to raise the recognition accuracy rate of user personalized information.

As shown in FIG. 1, the flowchart of a speech recognition method based on user personalized information provided by the embodiment of the present invention includes:

Step 101: receiving a speech signal.

Step 102: decoding the speech signal frame by frame according to a basic static decoding network to obtain decoding paths on all active nodes in the basic static decoding network, wherein the basic static decoding network is a decoding network associated with a basic name language model.

The process of decoding the speech signal by using the decoding network is a process of searching for the optimal path in the decoding network to implement the conversion from speech to text.

Specifically, the received continuous speech signal may be firstly sampled into a series of discrete energy values which are stored in a data cache.

Certainly, the received continuous speech signal may also be firstly processed with noise reduction in order to further improve the robustness of the system. Firstly, the continuous speech signal is divided into separate speech fragments and non speech segments by short-time energy and short-time zero crossing rate analysis of the speech signal, and then the speech segments obtained by dividing is processed for speech enhancement, during which time the environmental noise in the speech signal may be further eliminated by using Wiener filtering method and the like to improve the ability of the subsequent system in processing the signal.

A large number of redundant information not associated with speech recognition will still exist in the speech signal that has been processed for noise reduction, and the direct recognition thereof will likely lower the amount of calculation and recognition accuracy rate, so a recognition effective speech feature may be extracted from the speech energy signal that has been processed with noise reduction and be stored in a feature cache. Specifically, the MFCC (Mel Frequency Cepstrum Coefficient) feature of the speech may be extracted, and each frame of speech data with a window length of 25 ms and a frame shift of 10 ms may be short-time analyzed to obtain an MFCC parameter and first and second order differences thereof with a total of 39 frames. That is to say, each frame of the speech signal is quantized into a 39 dimensional feature sequence. Then, each frame of the speech signal therein is decoded according to the basic static decoding network to obtain decoding paths of the speech signal on all the active nodes in the basic static decoding network. Certainly, in the actual application, decoding may also be carried out after multiple frames of speech signals are received, to which the embodiment of the present invention does not limit.

Step 103: if a decoding path enters a name node in the basic static decoding network, extending an extra network on the name node according to an affiliated static decoding network of a user, wherein the affiliated static decoding network is a decoding network associated with a name language model of a particular user.

In the prior art, the search process of a decoding path is as follows: the cumulative historical path probability of each active node in the decoding network where each frame of the speech signal frame reaches is calculated in a time sequence from left to right. Specifically, for each frame of the speech signal frame which has to be examined, the probability of the accumulated historical path and historical path of all the active nodes in the current decoding network with respect to the speech signal frame may first be calculated. Then, the next frame of the speech signal frame is obtained, and the decoding is extended backward from the historical path which meets the predetermined conditions for the system.

Since the decoding network in the embodiment of the present invention is a basic static decoding network associated with the basic name language model, the network extension is carried out on the name node according to the affiliated static decoding network of the user when a decoding path enters a name node in the basic static decoding network. Since the affiliated static decoding network is a decoding network associated with a name language model of a particular user, the recognition accuracy rate of user personalized information is effectively raised by building and using the user personalized entry, especially by using the user personalized information about contacts.

Step 104: returning the recognition result after the decoding is completed.

After the last frame of the speech signal frame is decoded, the active node which has the maximum cumulative historical path probability is the optimal node, the historical path obtained by the decoding state retrospection from the optimal node is the optimal path, and the word sequence on the optimal path is the decoding result.

The speech recognition method based on user personalized information provided by the embodiment of the present invention includes the following steps: after a speech signal is received, decoding the speech signal frame by frame according to a basic static decoding network associated with the basic name language model to obtain decoding paths on all the active nodes in the decoding network, if a decoding path enters a name node in the basic static decoding network, further extending an extra network on the name node according to an affiliated static decoding network of the user associated with a name language model of a particular user, thus not only is the recognition accuracy rate of the personalized names of contacts in continuous speech recognition raised, but also the recognition accuracy rate of the contents of the context for names of contacts is raised. The information of contacts is used in many aspects of speech recognition, so that the overall recognition effect is optimized, and the recognition accuracy rate of user personalized information in continuous speech recognition is raised.

It should be noted that in the practical application, the above-mentioned basic static decoding network and affiliated static decoding network may be built online by the system, or may be built in an offline mode, and may be loaded in directly when the system is started to lower the amount of calculation of the system and the required internal memory, and further improve the decoding efficiency.

The above-mentioned basis static decoding network is a decoding network associated with the basic name language model, the affiliated static decoding network is a decoding network associated with the name language model of a particular user, and further details will be given below for the building process of the name-associated language model and associated decoding network in the embodiment of the present invention.

In the traditional speech recognition system, a language model is usually built by using the method of the statistical model, the recognition scope is reduced, and the recognition rate is raised through analog grammar and semantics knowledge. In general, the system first processes the huge training corpus to divide the words according to a predetermined dictionary, and then respectively statistically works out the probability of joint occurrence of the words, and builds a language model in the mode of conditional probability. Assuming that the probability of the occurrence of a word $w_k$ is only associated with the (n−1) words before it, it is taken as $p(w_k|W_1^{k-1})=p(w_k|W_{k-n+1}^{k-1})$.

However, due to the large number of Chinese names, traditional dictionaries rarely treat names as determined words, and thus the number of names after words are divided for the training corpus is extremely limited, the language model obtained from training also cannot well describe the probability of occurrence of a specific name, thereby the recognition accuracy rate of the name-associated whole word is affected.

To this end, in the embodiment of the present invention, a basic name language model for describing the statistical probability between common words and the statistical probability between common words and names, and a name language model of a particular user for describing the specific name statistical probability are separately built. Wherein, the basic name language model is used to describe the statistical probability between common words and the statistical probability between common words and names. The name language model of a particular user is used to describe the statistical probability of the specific name associated with the user.

Figure 2:
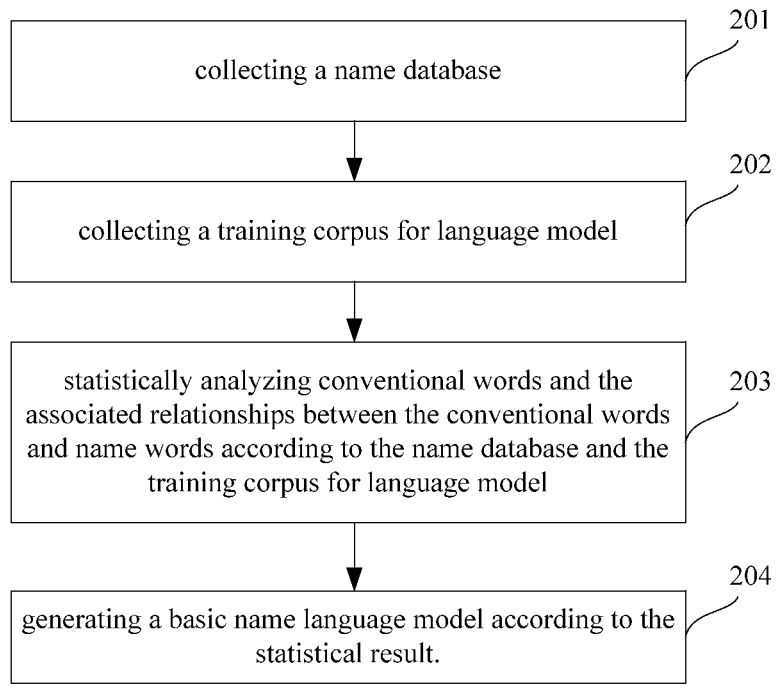
FIG. 2 is a flowchart of building a basic name language model in the embodiment of the present invention.

As shown in FIG. 2 which is a flowchart of building a basic name language model in the embodiment of the present invention, the flowchart includes:

Step 201: collecting a name database.

Specifically, a relatively large name database may be acquired to effectively cover common names.

Step 202: collecting a training corpus for language model.

Step 203: statistically analyzing conventional words and the associated relationships between the conventional words and name words according to the name database and the training corpus for language model.

Specifically, name detection may be carried out on the training corpus according to names in the name database, for example traditional name detection algorithm may be used for name detection. Then all of the specific names in the training corpus are replaced with a unified virtual name, and then conventional words and the associated relationships between the conventional words and name words are statistically analyzed on the replaced training corpus.

Step 204: generating a basic name language model according to the statistical result.

It should be noted that in the practical application, in the above-mentioned process, the specific names in the corpus may also be statistically analyzed to determine the frequency of the occurrence of all kinds of different name entries, so that the word frequency probability of the name entry is provided according to the word frequency in the process of generating a name language model of a particular user.

In comparison with the traditional language model, the basic name language model better describes the statistical probability of name attribute words and conventional words and supports the recognition of the whole name-words through induction and extraction of name words.

The above-mentioned basic name language model describes the statistical probability of name attribute words, but it still cannot solve the problem of recognition of specific name words. Meanwhile, there are a lot of homonymic characters for names in Chinese, a common name has dozens of or even more combinations of Chinese characters; in addition, for each user, there may still be some names which are not so commonly used in names of contacts in the user-specific personalization address book, namely each personalized name list cannot be uniformly covered in the training corpus.

Therefore, in order to better identify various particular-user-associated name words, in another embodiment of the present invention, a particular-user-associated name language model, namely the name language model of a particular user described previously, may further be built according to user needs. Specifically, after the information about contacts uploaded by the user is received, the name language model particular for the user may be obtained by extraction from the information about contacts.

Figure 3:
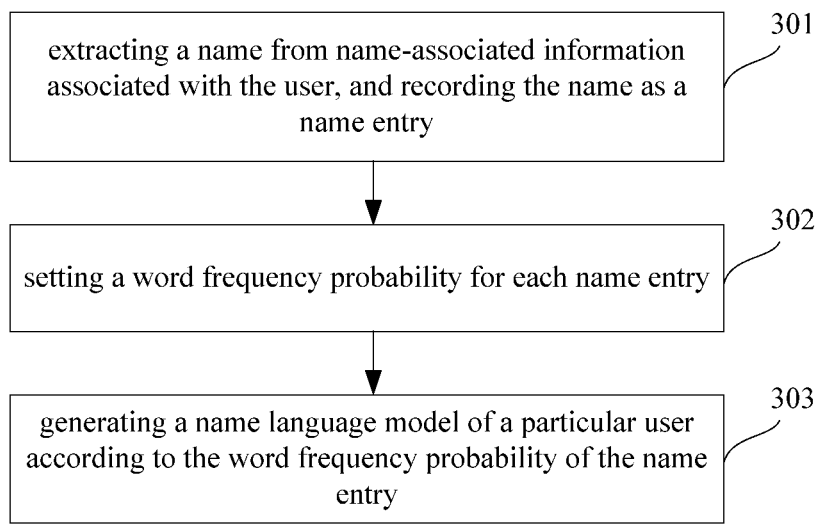
FIG. 3 is a flowchart of building a name language model of a particular user in the embodiment of the present invention.

As shown in FIG. 3, the flowchart of building a name language model of a particular user in the embodiment of the present invention includes:

Step 301: extracting a name from name-associated information associated with the user, and recording the name as a name entry.

The name-associated information may be an address book and the like.

Step 302: setting a word frequency probability for each name entry.

It is most simple that the word frequency probability of each name entry may be provided as equal to one another, or provided correspondingly according to the name frequency worked out statistically in the huge corpus; furthermore, the word frequency may also be provided for the name entry according to the level of frequency based on the user historical-use record, and the subsequent update thereof is allowed.

Step 303: generating a name language model of a particular user according to the word frequency probability of the name entry.

In the embodiment of the present invention, a corresponding multiple decoding search static network may be obtained by using a dictionary, an acoustic model and other predetermined models in combination with the multiple language models built as mentioned above (namely, the basic name language model and the name language model of a particular user) in extension. Specifically, a low order acoustic model such as uniphone model may be selected to form a decoding network by extending the words in the language model into corresponding acoustic units. Furthermore, in order to improve the decoding accuracy rate, a higher order acoustic model such as biphone (double phonemes), or triphone (three phonemes) model may also be selected to improve the distinguishability between different pronunciation units.

As mentioned above, when conventional words and the associated relationships between the conventional words and name words are statistically analyzed, all of the specific names in the training corpus may first be replaced with a unified virtual name, and then conventional words and the associated relationships between the conventional words and name words may be statistically analyzed on the replaced training corpus to build a basic name language model. That is to say, the basic name language model contains a virtual name unit, for which the specific pronunciation cannot be made clear before the decoding is done. To this end, the embodiment of the invention also provides a network extension method based on an acoustic model to build a static decoding network associated with the basic name language model.

Figure 4:
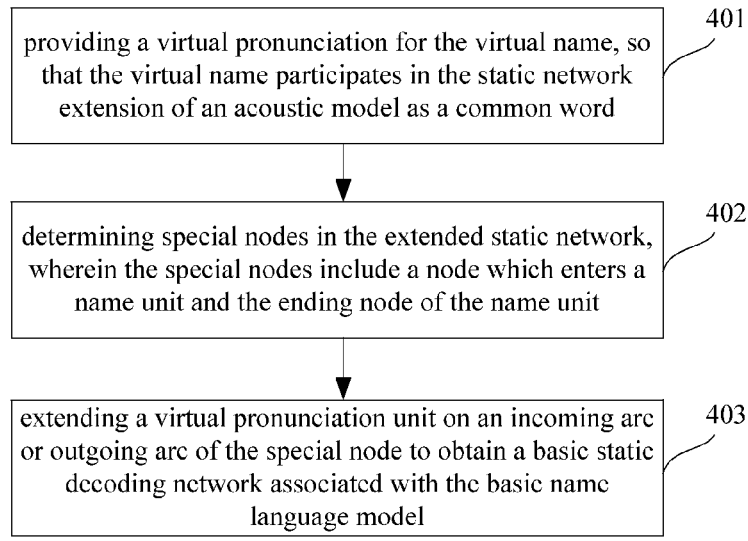
FIG. 4 is a flowchart of building a basic static decoding network associated with the basic name language model in the embodiment of the present invention.

As shown in FIG. 4 which is a flowchart of building a basic static decoding network associated with the basic name language model in the embodiment of the present invention, the flowchart includes the following steps:

Step 401: providing a virtual pronunciation for the virtual name, so that the virtual name participates in the static network extension of an acoustic model as a common word.

Step 402: determining special nodes in the extended static network, wherein the special nodes include a node which enters a name unit and the ending node of the name unit.

Figure 5:
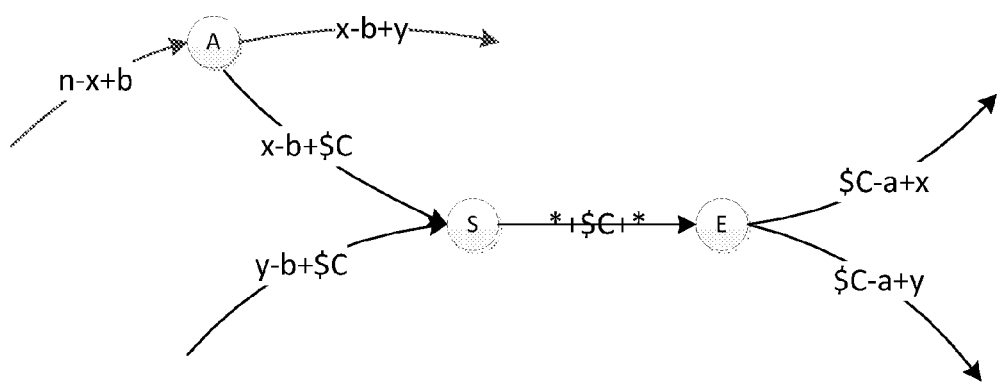
FIG. 5 is a schematic diagram of expansion of a decoding network associated with the basic name language model in the embodiment of the present invention.

The virtual pronunciation is taken as $C, if the triphone acoustic model is taken as an example, as shown in FIG. 5, the extended static network will mainly include three types of nodes: a conventional node (node A) and two kinds of special nodes (node S and node E).

Wherein, a, b, x, y and n each represents a common pronunciation unit, $C represents the pronunciation unit of the virtual name, which is called virtual pronunciation unit to facilitate the description.

Node A is a conventional node, namely the triphone model on the arc which enters node A and leaves node A may be determined in advance.

Node S is a special node, the outgoing arc thereof is a name unit, namely the node which enters the name unit, and obviously, the uncertainty of the specific name on the incoming arc of the node results in the uncertainty of the right-associated extension of the triphone model on the incoming arc, such as x−b+$C and y−b+$C in the figure.

Node E is a special node, the incoming arc thereof is a name unit, namely the ending node of the name unit, and correspondingly, the left-association of the triphone model on the outgoing arc thereof also cannot be determined, such as $C−a+x and $C−a+y in the figure.

Step 403: extending a virtual pronunciation unit on an incoming arc or outgoing arc of the special node to obtain a basic static decoding network associated with the basic name language model.

For the incoming arc of node S, such as x−b+$C and y−b+$C, $C is extended to replace all the possible phone units, and correspondingly, sets of triphone models including x−b+a, x−b+b will come out by an extension from arc x−b+$C. The extension mode may be determined according to the regular pattern and triphone group of (x−b).

For the outgoing arc of node E, similar operations are also performed, for example for $C-a+x and $C-a+y, $C is replaced into all the possible phone units, and thus a corresponding accurate triphone model comes out by extension.

The arc *−$C+* from node S to node E is kept unchanged, and the replacement of the specific-name static decoding network for it is carried out when a subsequent dynamic decoding enters node S.

Similarly, when a static decoding network associated with the name language model of a particular user is built, for the extension of a specific language model associated with a particular user, a similar method has to be used when a high order acoustic model is used.

Figure 6:
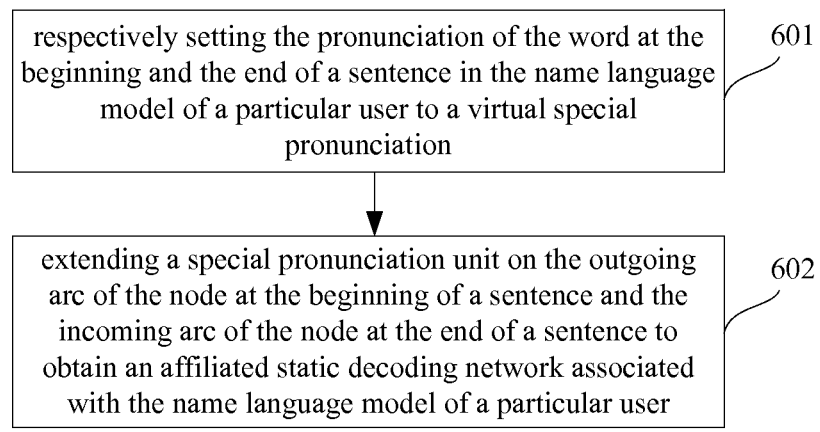
FIG. 6 is a flowchart of building an affiliated static decoding network associated with the name language model of a particular user in the embodiment of the present invention.

As shown in FIG. 6 which is a flowchart of building an affiliated static decoding network associated with the name language model of a particular user in the embodiment of the present invention, the flowchart includes the following steps:

Step 601: respectively setting the pronunciation of the word at the beginning and the end of a sentence in the name language model of a particular user to a virtual special pronunciation.

Usually the language model generally contains two special words, namely the word at the beginning of a sentence <s> and the word at the end of a sentence </s>, which respectively show the start and end of the sentence, and the pronunciation of the words at the beginning and the end of a sentence is generally defined as sil which means silence.

Figure 7:
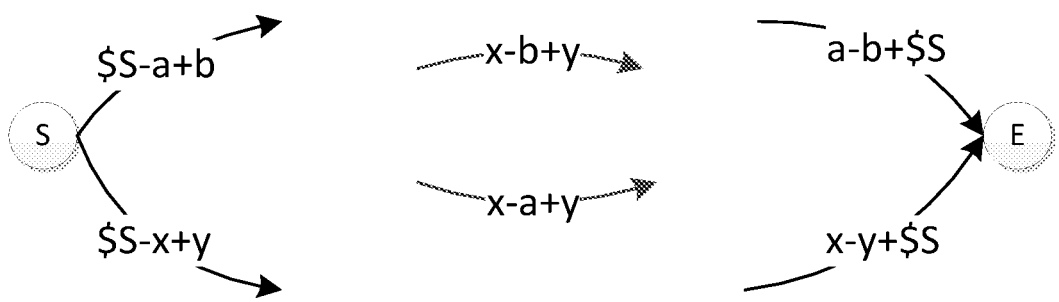
FIG. 7 is a schematic diagram of expansion of a decoding network associated with the name language model of a particular user in the embodiment of the present invention.

In the embodiment of the present invention, in order to ensure the connection between the name unit and the original static network in the process of identification, a special processing may be carried out on the pronunciation of the words at the beginning and the end of a sentence of the name language model of a particular user to build a static network of triphone model extension, specifically as shown in FIG. 7.

Wherein, the pronunciation of the word at the beginning of a sentence is set to a virtual special pronunciation $S, and the pronunciation of the word at the end of a sentence is set to a virtual special pronunciation $E. The left association of the triphone model on the arc which starts off from the node S at the beginning of a sentence is uncertain, such as $S−a+b and $S−x+y in the figure, whereas the right association of the triphone model on the arc of the node E at the end of a sentence is uncertain, such as a−b+$S and x−y+$S in the figure, and the model on any other arc is kept as a conventional triphone model.

Step 602: extending a special pronunciation unit on the outgoing arc of the node at the beginning of a sentence and the incoming arc of the node at the end of a sentence to obtain an affiliated static decoding network associated with the name language model of a particular user.

Specifically, for the outgoing arc of the node S at the beginning of a sentence, such as $S−a+b and $S−x+y, $S is replaced into all the possible phones, and thus a corresponding accurate triphone model comes out by extension; a similar operation is also performed for the incoming arc of the node E at the end of a sentence, such as a−b+$S and x−y+$S, $S is replaced into all the possible phones, and thus a corresponding accurate triphone model comes out by extension.

As mentioned earlier, the above-mentioned basic static decoding network and affiliated static decoding network may be built in an offline mode, wherein the affiliated static decoding network is associated with a specific user: that is, a different user may correspond to a different affiliated static decoding network. Therefore, in the process of recognizing the received speech signal, an affiliated static decoding network for the user may be loaded in, for which the opportune moment for specific loading may be different, for example it may be before the speech signal is decoded frame by frame according to the basic static decoding network, or after a decoding path enters a name node in the basic static decoding network or the like, which is respectively illustrated below with examples.

Figure 8:
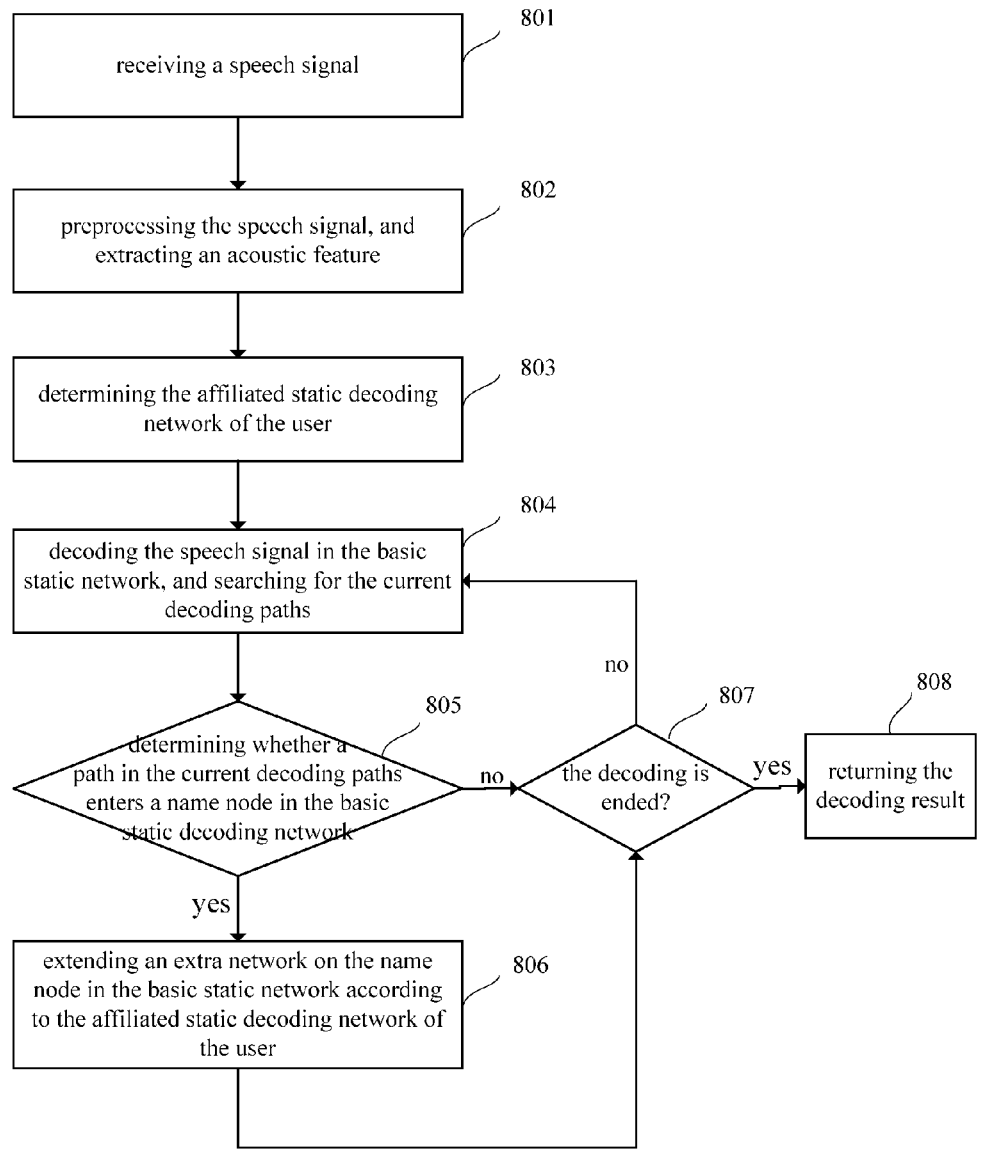
FIG. 8 is a flowchart of specific decoding in a speech recognition method based on user personalized information provided by the embodiment of the present invention.

As shown in FIG. 8 which is a flowchart of specific decoding in a speech recognition method based on user personalized information provided by the embodiment of the present invention, the flowchart includes the following steps:

Step 801: receiving a speech signal.

Step 802: preprocessing the speech signal, and extracting an acoustic feature.

Step 803: determining the affiliated static decoding network of the user.

Step 804: decoding the speech signal in the basic static network, and searching for the current decoding paths.

Step 805: determining whether a path in the current decoding paths enters a name node in the basic static decoding network; if yes, performing step 806; otherwise performing step 807.

Step 806: extending an extra network on the name node in the basic static network according to the affiliated static decoding network of the user.

Specifically, a replacement may be carried out on the name node in the basic static network by using the affiliated static decoding network; or the decoding path which enters the name node is provided and thus directly enters the affiliated static decoding network of the user.

It should be noted that when the decoding path which enters the name node is provided and thus enters the affiliated static decoding network of the user, on the receipt of a new speech frame signal, the decoding path which enters the affiliated static decoding network of the user will search for the subsequent decoding path in the affiliated static decoding network of the user, and return to the ending node of the name node of the basic static network when the path reaches the ending node of the affiliated static decoding network.

Step 807: determining whether the current frame is the last frame, namely whether the decoding is ended; if yes, performing step 808; otherwise, going to step 804.

Step 808: returning the decoding result.

Figure 9:
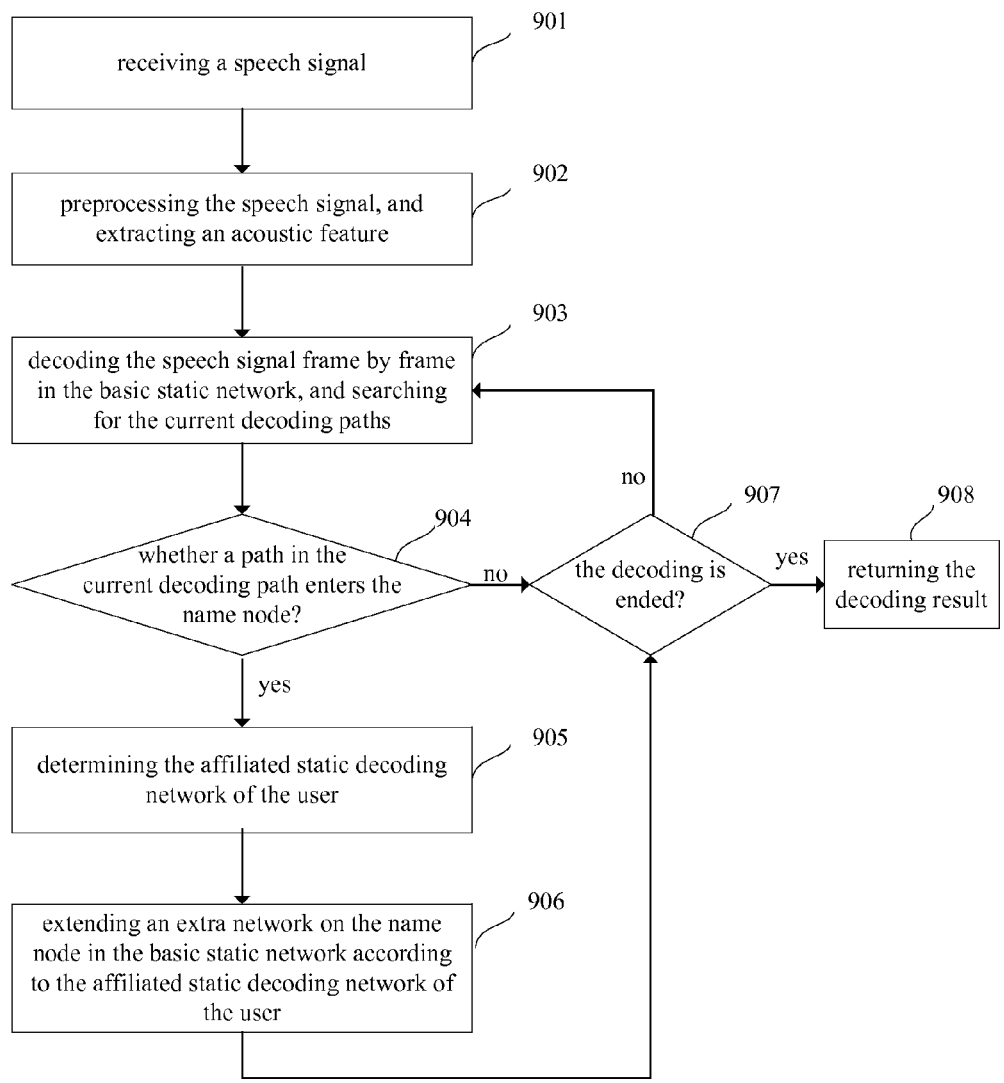
FIG. 9 is another flowchart of specific decoding in a speech recognition method based on user personalized information provided by the embodiment of the present invention.

As shown in FIG. 9 which is another flowchart of specific decoding in a speech recognition method based on user personalized information provided by the embodiment of the present invention, the flowchart includes the following steps:

Step 901: receiving a speech signal.

Step 902: preprocessing the speech signal, and extracting an acoustic feature.

Step 903: decoding the speech signal frame by frame in the basic static network, and searching for the current decoding paths.

Step 904: determining whether a path enters the name node in the basic static decoding network in the current paths; if yes, performing step 905; otherwise, performing step 907.

Step 905: determining the affiliated static decoding network of the user.

Step 906: extending an extra network on the name node in the basic static network according to the affiliated static decoding network of the user.

Specifically, the name node in the basic static network may be replaced by using the affiliated static decoding network; or the decoding path which enters the name node is provided and thus directly enters the affiliated static decoding network of the user.

It should be noted that when the decoding path which enters the name node is provided and thus enters the affiliated static decoding network of the user, on the receipt of a new speech frame signal, the decoding path which enters the affiliated static decoding network of the user will search for the subsequent decoding path in the affiliated static decoding network of the user, and return to the ending node of the name node of the basic static network when the path reaches the ending node of the affiliated static decoding network.

Step 907: determining whether the current frame is the last frame, namely whether the decoding is ended; if yes, performing step 908; otherwise, going to step 903.

Step 908, returning the decoding result.

It should be noted that in the above-mentioned steps 803 and 905, there may be a variety of modes for determining the affiliated static decoding network of the user, such as:

(1) determining the identity of the user according to the feature of the speech signal of the user, namely the specific user, and then determining the affiliated static decoding network thereof according to the identity of the user; and (2) determining the identity of the user according to the equipment code or account number of the user, and then determining the affiliated static decoding network thereof according to the identity of the user.

It can be seen that the speech recognition method based on user personalized information provided by the embodiment of the present invention includes the following steps: after a speech signal is received, decoding the speech signal frame by frame according to a basic static decoding network associated with the basic name language model to obtain decoding paths on all the active nodes in the decoding network, if a decoding path enters a name node in the basic static decoding network, further extending an extra network on the name node according to the affiliated static decoding network of a user associated with a name language model of a particular user, thus not only is the recognition accuracy rate of the personalized names of contacts in continuous speech recognition raised, but also the recognition accuracy rate of the contents of the context for names of contacts is raised. The information of contacts is used in many aspects of speech recognition, so that the overall recognition effect is optimized, and the recognition accuracy rate of user personalized information in continuous speech recognition is raised.

It should be noted that the speech recognition method based on user personalized information of the embodiment of the present invention is not only suitable for user name decoding, but also applicable to other definable speech recognition of personalization information, such as address recognition and the like.

Figure 10:
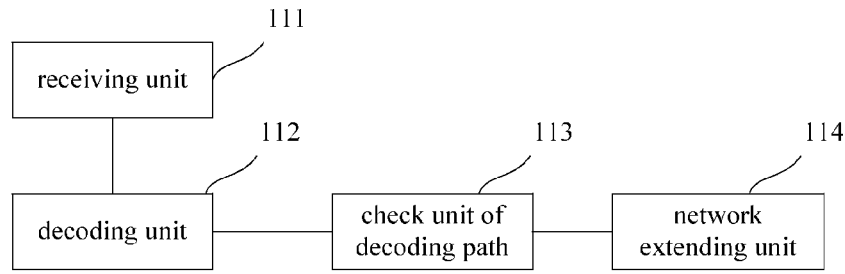
FIG. 10 is a structural schematic diagram of a speech recognition system based on user personalized information provided by the embodiment of the present invention.

Correspondingly, the embodiment of the present invention also provides a speech recognition system based on user personalized information, as shown in FIG. 10 which is a structural schematic diagram of the system.

In the embodiment, the system includes:

a receiving unit 111 for receiving a speech signal;

a decoding unit 112 for decoding the speech signal frame by frame according to a basic static decoding network to obtain a decoding path on each active node in the basic static decoding network, wherein the basic static decoding network is a decoding network associated with a basic name language model;

a check unit of decoding path 113 for determining whether a decoding path enters a name node in the basic static decoding network;

a network extending unit 114 for, after the check unit of decoding path 113 determines that a decoding path enters a name node in the basic static decoding network, extending an extra network on the name node according to an affiliated static decoding network of a user, wherein the affiliated static decoding network is a decoding network associated with a name language model of a particular user.

The decoding unit 112 is also used to return the recognition result after the decoding is completed.

The process of decoding the user-input speech signal by the decoding unit 112 is a process of searching for the optimal path in the basic static decoding network to implement the conversion from speech to text. Specifically, the received continuous speech signal may first be sampled into a series of discrete energy values which are stored in a data cache. Certainly, in order to further improve the robustness of the system, the system may also include a preprocessing unit (not shown in the figure) for processing the continuous speech signal received by the receiving unit 111 for noise reduction before the speech signal input by the user is decoded by the decoding unit 112. Specifically, the continuous speech signal may first be divided into separate speech fragments and non speech segments by short-time energy and short-time zero crossing rate analysis of the speech signal, and then the speech segments obtained by dividing is processed for speech enhancement, during which the environmental noise in the speech signal may be further eliminated by using the Wiener filtering method and the like to improve the ability of the subsequent system in processing the signal.

A large number of redundant information not associated with speech recognition will still exist in the speech signal that has been processed for noise reduction, and the direct recognition thereof will likely lower the amount of calculation and recognition accuracy rate, therefore a recognition effective speech feature may be extracted from the speech energy signal that has been processed for noise reduction and be stored in a feature cache. Specifically, the MFCC (Mel Frequency Cepstrum Coefficient) feature of the speech may be extracted, and each frame of speech data with a window length of 25 ms and a frame shift of 10 ms may be short-time analyzed to obtain an MFCC parameter and first and second order differences thereof with a total of 39 frames. That is to say, each frame of the speech signal is quantified into a 39 dimensional feature sequence. Then, the speech signal is decoded by the decoding unit 112 according to the basic static decoding network to obtain decoding paths of the speech signal on all the active nodes in the basic static decoding network. After the decoding is completed, the active node which has the maximum cumulative historical path probability is the optimal node, the historical path obtained by decoding state retrospection from the optimal node is the optimal path, and the word sequence on the optimal path is the decoding result.

Since the basic static decoding network is a decoding network associated with the basic name language model, when a decoding path enters a name node in the basic static decoding network, a network extension is carried out on the name node by the network extending unit 114 according to the affiliated static decoding network of the user. Since the affiliated static decoding network is a decoding network associated with the name language model of a particular user, the recognition accuracy rate of user personalized information is effectively raised by building and using a user personalization entry, especially by using user personalized information about contacts.

The speech recognition system based on user personalized information provided by the embodiment of the present invention, after a speech signal is received, decodes the speech signal frame by frame according to a basic static decoding network associated with a basic name language model to obtain decoding paths on all the active nodes in the decoding network, if a decoding path enters a name node in the basic static decoding network, further extending an extra network on the name node according to an affiliated static decoding network of a user associated with a name language model of a particular user, thus not only is the recognition accuracy rate of the personalized names of contacts in continuous speech recognition raised, but also the recognition accuracy rate of the contents of the context for names of contacts is raised. The information of contacts is used in many aspects of speech recognition, so that the overall recognition effect is optimized, and the recognition accuracy rate of user personalized information in continuous speech recognition is raised.

The above-mentioned network extending unit 114 has to carry out a network extension on the name node according to the affiliated static decoding network of the user. If the system has only one user, the affiliated static decoding network is the only one, may be built online by the system, or built in an offline mode, and loaded in directly when the system is started up. If the system has a plurality of users, the current user and the affiliated static decoding network corresponding to the user have to be identified. Similarly, the affiliated static decoding networks of these different users may be built online by the system, or built in an offline mode, and loaded in directly when the system is started up.

It should be noted that in the specific application, determination of the affiliated static decoding network corresponding to the current user may be completed at different opportune moments.

Figure 11:
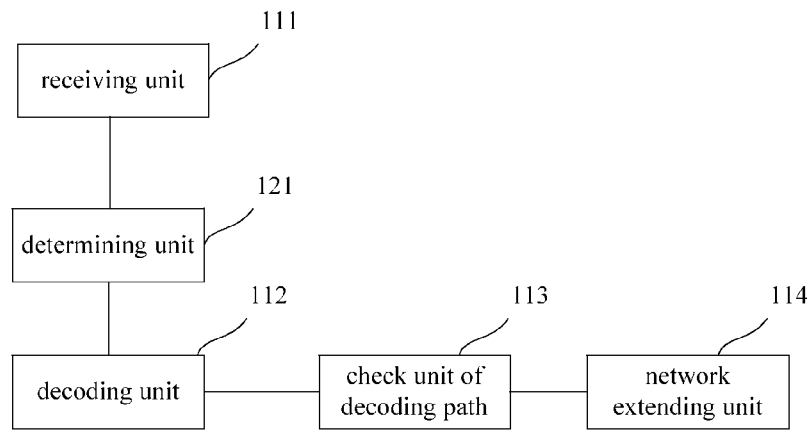
FIG. 11 is a structural schematic diagram of specific implementation of a speech recognition system based on user personalized information provided by the embodiment of the present invention.

As shown in FIG. 11, the figure is a structural schematic diagram of specific implementation of a speech recognition system based on user personalized information provided by the present invention. Different from FIG. 10, in this embodiment, the speech recognition system based on user personalized information also includes: a determining unit 121 for determining the affiliated static decoding network of the user before the decoding unit 112 decodes the speech signal according to the basic static decoding network.

Figure 12:
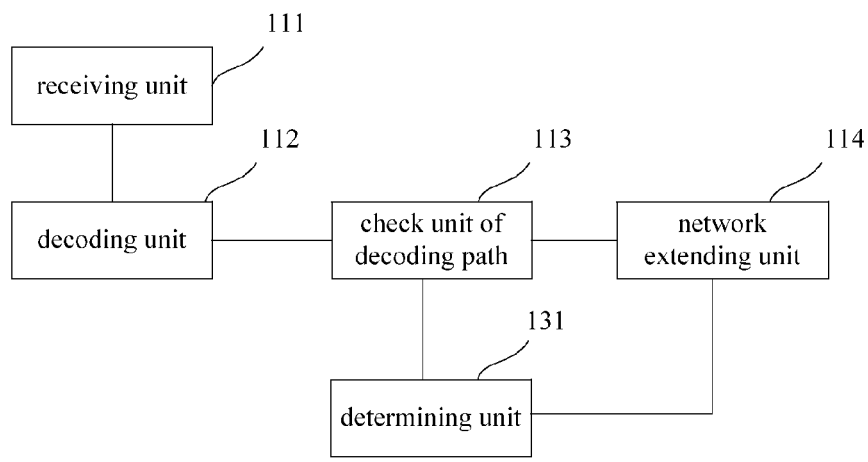
FIG. 12 is another structural schematic diagram of specific implementation of a speech recognition system based on user personalized information provided by the embodiment of the present invention.

As shown in FIG. 12, the figure is another structural schematic diagram of specific implementation of a speech recognition system based on user personalized information provided by the present invention. Different from FIG. 10, in this embodiment, the speech recognition system based on user personalized information also includes: a determining unit 131 for determining the affiliated static decoding network of the user after the check unit of decoding path 113 determines that a decoding path enters a name node of the basic static decoding network.

It should be noted that both the determining unit 121 and the determining unit 131 may determine the user identity according to the feature of the speech signal, and then determine the affiliated static decoding network of the user according to the user identity; or determine the user identity according to the equipment code or account number of the user, and then determine the affiliated static decoding network of the user according to the user identity.

In the practical application, the above-mentioned basic static decoding network and affiliated static decoding network may be built online by the system, or built in an offline mode, and loaded in directly when the system is started to reduce the amount of calculation of the system and the required internal memory, and further improve the decoding efficiency.

Figure 13:
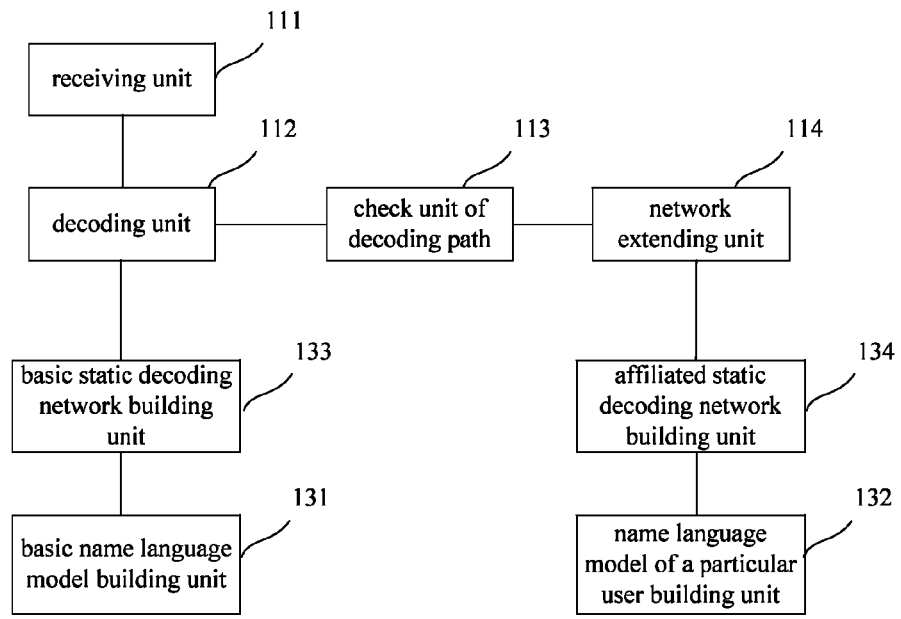
FIG. 13 is yet another structural schematic diagram of specific implementation of a speech recognition system based on user personalized information provided by the embodiment of the present invention.

Due to the large number of Chinese names, traditional dictionaries rarely treat names as determined words, and thus the number of names is extremely limited after words are divided in the training corpus, the language model obtained from training also cannot well describe the probability of the occurrence of a specific name, thereby the recognition accuracy rate of the name-associated whole word is affected. To this end, in another embodiment of the system in the present invention, as shown in FIG. 13, the system may further include:

a basic name language model building unit 131 for building a basic name language model;

a name language model of a particular user building unit 132 for building a name language model of a particular user;

a basic static decoding network building unit 133 for building a basic static decoding network associated with the basic name language model;

an affiliated static decoding network building unit 134 for building an affiliated static decoding network associated with the name language model of a particular user.

Figure 14:
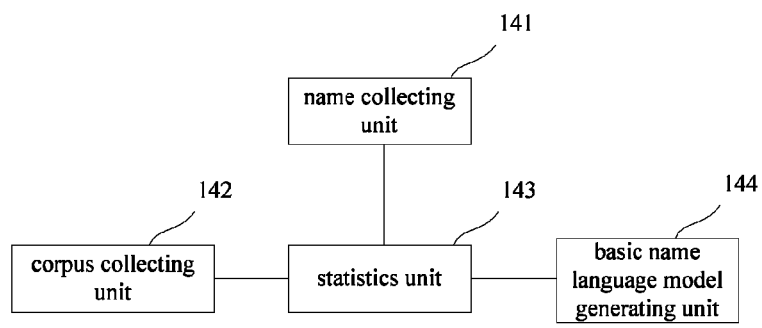
FIG. 14 is a structural schematic diagram of a basic name language model building unit in a speech recognition system based on user personalized information provided by the embodiment of the present invention.

As shown in FIG. 14, the figure is a structural schematic diagram of a basic name language model building unit in a speech recognition system based on user personalized information provided by the embodiment of the present invention.

The basic name language model building unit includes:

a name collecting unit 141 for collecting a name database;

a corpus collecting unit 142 for collecting a training corpus for language model;

a statistics unit 143 for statistically analyzing conventional words and the associated relationships between the conventional words and name words according to the name database and the training corpus for language model; and a basic name language model generating unit 144 for generating a basic name language model according to a statistical result obtained by the statistics unit 143.

The statistics unit 143 may carry out name detection in the training corpus according to names in the name database, for example traditional name detection algorithm may be used for name detection. Then all of the specific names in the training corpus are replaced with a unified virtual name, and then conventional words and the associated relationships between the conventional words and name words are statistically analyzed on the replaced training corpus. To this end, the statistics unit 143 may include:

a detecting subunit for carrying out name detection in the training corpus according to names in the name database;

a replacing subunit for replacing all of the specific names in the training corpus with a unified virtual name; and a statistics subunit for statistically analyzing conventional words and the associated relationships between the conventional words and name words according to the replaced training corpus.

In comparison with the traditional language model, the basic name language model built by the basic name language model building unit better describes the statistical probability of name attribute words and conventional words and supports the recognition of the whole word of the name through induction and extraction of name words.

Figure 15:
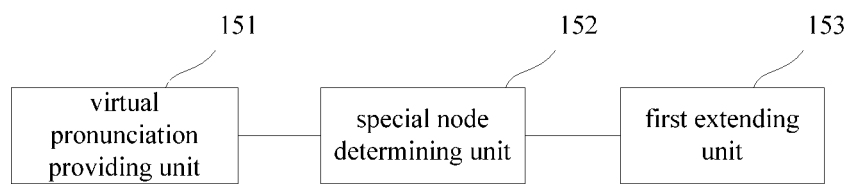
FIG. 15 is a structural schematic diagram of a basic static decoding network building unit in a speech recognition system based on user personalized information provided by the embodiment of the present invention.

As shown in FIG. 15, the figure is a structural schematic diagram of a basic static decoding network building unit in a speech recognition system based on user personalized information provided by the embodiment of the present invention.

The basic static decoding network building unit includes:

a virtual pronunciation providing unit 151 for providing a virtual pronunciation for the virtual name, so that the virtual name can participates in the static network extension of an acoustic model as a common word;

a special node determining unit 152 for determining special nodes in the extended static network according to the virtual pronunciation, wherein the special nodes include: a node which enters a name unit and an ending node of a name unit; and a first extending unit 153 for extending the virtual pronunciation unit on an incoming arc or outgoing arc of the special node to obtain a basic static decoding network associated with the basic name language model.

Figure 16:
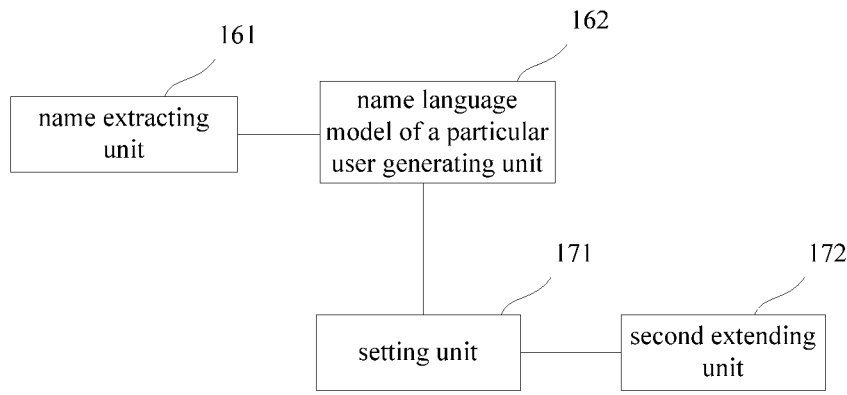
FIG. 16 is a structural schematic diagram of a name language model of a particular user building unit and an affiliated static decoding network building unit in a speech recognition system based on user personalized information provided by the embodiment of the present invention.

As shown in FIG. 16, the figure is a structural schematic diagram of a name language model of a particular user building unit and an affiliated static decoding network building unit in a speech recognition system based on user personalized information provided by the embodiment of the present invention.

The name language model of a particular user building unit includes:

a name extracting unit 161 for extracting a name from name-associated information associated with the user, and recording the name as a name entry;

a name language model of a particular user generating unit 162 for setting a word frequency probability for each name entry, and generating a name language model of a particular user according to the word frequency probability of the name entry;

the affiliated static decoding network building unit includes:

a setting unit 171 for respectively setting the pronunciation of the word at the beginning and the end of a sentence in the name language model of a particular user to a virtual special pronunciation; and a second extending unit 172 for extending a special pronunciation unit on the outgoing arc of the node at the beginning of a sentence and the incoming arc of the node at the end of a sentence to obtain an affiliated static decoding network associated with the name language model of a particular user.

Not only may the recognition accuracy rate of personalized names of contacts in continuous speech recognition raised, but also the recognition accuracy rate of the contents of the context of names of contacts may be raised by using the speech recognition system based on user personalized information provided by the embodiment of the invention. The information of contacts is used in many aspects of speech recognition, so that the overall recognition effect is optimized, and the recognition accuracy rate of user personalized information in continuous speech recognition is raised.

It should be noted that the speech recognition system based on user personalized information provided by the embodiment of the present invention is not only suitable for user name decoding, but also suitable for the speech recognition of other definable personalized information, such as address recognition and the like.

In the present specification, various embodiments are described in a progressive mode, the same or similar portions between the respective embodiments can refer to each other, what is different from other embodiments is the focus of each embodiment in description. In particular, for the system embodiments which are substantially similar as the method embodiments, the description was relatively simple; just refer to part of the illustration for method embodiments. The above-described system embodiments are merely illustrative, wherein the unit illustrated as a separating member may or may not be physically separated, the component displayed as a unit may be or may not be a physical unit, i.e., may be located in one place, or may be distributed to multiple network elements. Part or all of the modules can be selected according to the actual needs to achieve the purpose of the scheme in the present embodiment. That can be understood and implemented by those skilled in the art without creative efforts.

The embodiments of the present invention are described above in detail, herein the present invention is illustrated by using specific embodiments, explaining that an example of the above embodiment is only used to help understand the method and device of the present invention; at the same time, for those skilled in the art, based on the idea of the invention, there will be changes in the specific embodiments and scope of applications. In summary, the contents of this document should not be construed as limit to the present invention.

The invention claimed is:

1. A method, comprising:
receiving, by a processing device, a speech signal;
decoding, by the processing device, the speech signal according to a basic static decoding network to obtain a decoding path on each active node in the basic static decoding network, wherein the basic static decoding network is formed by extending words in a basic name language model into corresponding acoustic units, and wherein the basic name language model comprises a first statistical probability between two common words and a second statistical probability between a common word and a name;
generating, by the processing device, a user-specific name language model comprising a third statistical probability between the name and a user identifier;
building, by the processing device, an affiliated static decoding network associated with the user-specific name language model by extending words in the user-specific name language model into corresponding acoustic units, wherein building the affiliated static decoding network further comprises:
  setting a first pronunciation of a first word at a beginning of a sentence in the user-specific name language model to a first virtual pronunciation;
  setting a second pronunciation of a second word at an end of the sentence in the user-specific name language model to a second virtual pronunciation; and
  extending a special pronunciation unit on an outgoing arc of a node corresponding to the beginning of the sentence and an incoming arc of the node corresponding to the end of the sentence to obtain the affiliated static decoding network associated with the user-specific name language model; and
responsive to identifying that a decoding path enters a name node in the basic static decoding network, extending, by the processing device, an extra network associated with the name node according to the affiliated static decoding network; and
returning, by the processing device, a recognition result after the decoding is completed, wherein a recognition accuracy rate for names is improved.

2. The method according to claim 1, further comprising:
determining the affiliated static decoding network one of before or after the speech signal is decoded according to the basic static decoding network.

3. The method according to claim 2, wherein determining the affiliated static decoding network further comprises:
determining an identity of the user according to a feature of the speech signal, and then determining the affiliated static decoding network according to the identity of the user; or
determining the identity of the user according to at least one of an equipment code or an account number associated with the user, and then determining the affiliated static decoding network according to the identity of the user.

4. The method according to claim 1, further comprising:
generating the basic name language model; and
building the basic static decoding network associated with the basic name language model.

5. The method according to claim 4, wherein generating the basic name language model further comprises:
respectively collecting a name database and a training corpus for a language model;
statistically analyzing conventional words and associated relationships between the conventional words and name words according to the name database and the training corpus for the language model to generate a statistical result; and
generating the basic name language model according to the statistical result.

6. The method according to claim 5, wherein statistically analyzing conventional words and the associated relationships between the conventional words and name words according to the name database and the training corpus for language model further comprises:
performing name detection in the training corpus according to names in the name database;
replacing all specific names in the training corpus with a unified virtual name to update the training corpus; and
statistically analyzing conventional words and the associated relationships between the conventional words and name words according to the updated training corpus.

7. The method according to claim 6, wherein generating the basic static decoding network further comprises:
providing a virtual pronunciation for the virtual name to allow the virtual name participating in static network extension of an acoustic model as a common word;
determining special nodes in the extended static network according to the virtual pronunciation, wherein the special nodes comprise: a node which enters a name unit and an ending node of the name unit; and
extending a virtual pronunciation unit on an incoming arc or outgoing arc of the special node to obtain the basic static decoding network associated with the basic name language model.

8. The method according to claim 4, wherein generating the user-specific name language model further comprises:
extracting a name from name-association information associated with the user, and recording the name as a name entry;
setting a word frequency probability for the name entry; and
generating the user-specific name language model according to a word frequency probability of the name entry.

9. A speech recognition system based on user personalized information, comprising:
a memory; and
a processing device, communicatively coupled to the memory, to:
receive a speech signal;
decode the speech signal according to a basic static decoding network to obtain a decoding path on each active node in the basic static decoding network, wherein the basic static decoding network is formed by extending words in a basic name language model into corresponding acoustic units, and wherein the basic name language model comprises a first statistical probability between two common words and a second statistical probability between a common word and a name;
generate a user-specific name language model comprising a third statistical probability between the name and a user identifier;
build an affiliated static decoding network associated with the user-specific name language model by extending words in the user-specific name language model into corresponding acoustic units, wherein to build the affiliated static decoding network, the processing device is further to:
set a first pronunciation of a first word at a beginning of a sentence in the user-specific name language model to a first virtual pronunciation;
set a second pronunciation of a second word at an end of the sentence in the user-specific name language model to a second virtual pronunciation; and
extend a special pronunciation unit on an outgoing arc of a node corresponding to the beginning of the sentence and an incoming arc of the node corresponding to the end of the sentence to obtain the affiliated static decoding network associated with the user-specific name language model; and
responsive to identifying that a decoding path enters a name node in the basic static decoding network, extend an extra network associated with the name node according to the affiliated static decoding network; and
return a recognition result after the decoding is completed, wherein a recognition accuracy rate for names is improved.

10. The system according to claim 9, wherein to determine the affiliated static decoding network, the processing device is further to determining the affiliated static decoding network one of before or after the speech signal is decoded according to the basic static decoding network.

11. The system according to claim 10, wherein to determine the affiliated static decoding network, the processing device is further to:
determine an identity of the user according to a feature of the speech signal, and then determining the affiliated static decoding network according to the identity of the user; or
determine the identity of the user according to at least one of an equipment code or an account number associated with the user, and then determining the affiliated static decoding network according to the identity of the user.

12. The system according to claim 9, wherein the processing device is further to:
generate the basic name language model; and
build the basic static decoding network associated with the basic name language model.

13. The system according to claim 12, wherein to generate the basic name language model, the processing device is further to:
- respectively collect a name database and a training corpus for a language model;
- statistically analyze conventional words and associated relationships between the conventional words and name words according to the name database and the training corpus for the language model to generate a statistical result; and
- generate the basic name language model according to the statistical result.

14. The system according to claim 13, wherein to analyze conventional words and the associated relationships, the processing device is further to:
- perform name detection in the training corpus according to names in the name database;
- replace all specific names in the training corpus with a unified virtual name to update the training corpus; and
- statistically analyze conventional words and the associated relationships between the conventional words and name words according to the updated training corpus.

15. The system according to claim 14, wherein to generate the basic static decoding network, the processing device is further to:
- provide a virtual pronunciation for the virtual name to allow the virtual name participating in static network extension of an acoustic model as a common word;
- determine special nodes in the extended static network according to the virtual pronunciation, wherein the special nodes comprise: a node which enters a name unit and an ending node of the name unit; and
- extend a virtual pronunciation unit on an incoming arc or outgoing arc of the special node to obtain the basic static decoding network associated with the basic name language model.

16. The system according to claim 12, wherein to generate the user-specific name language model, the processing device is further to:
- extract a name from name-association information associated with the user, and recording the name as a name entry;
- set a word frequency probability for the name entry; and
- generate the user-specific name language model according to a word frequency probability of the name entry.

* * * * *